US009356977B2

(12) United States Patent
Christiansen et al.

(10) Patent No.: US 9,356,977 B2
(45) Date of Patent: May 31, 2016

(54) ACQUIRING ONLINE MEETING DATA RELATING TO AN ONLINE MEETING

(71) Applicant: Citrix Systems, Inc., Fort Laurderdale, FL (US)

(72) Inventors: Bernd Oliver Christiansen, Santa Barbara, CA (US); Albert Alexandrov, Goleta, GA (US); Ashish V. Thapliyal, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 331 days.

(21) Appl. No.: 14/015,091

(22) Filed: Aug. 30, 2013

(65) Prior Publication Data
US 2015/0067026 A1 Mar. 5, 2015

(51) Int. Cl.
| | |
|---|---|
| H04L 12/18 | (2006.01) |
| H04N 7/15 | (2006.01) |
| H04L 29/06 | (2006.01) |
| H04L 29/08 | (2006.01) |
| G06F 17/30 | (2006.01) |
| H04N 21/00 | (2011.01) |
| G06Q 10/10 | (2012.01) |
| H04N 21/234 | (2011.01) |

(Continued)

(52) U.S. Cl.
CPC .............. *H04L 65/403* (2013.01); *G06F 17/30* (2013.01); *G06Q 10/1095* (2013.01); *H04L 12/18* (2013.01); *H04L 67/10* (2013.01); *H04N 21/00* (2013.01); *H04N 21/23418* (2013.01); *H04N 21/4223* (2013.01); *H04N 21/4394* (2013.01); *H04N 21/4788* (2013.01); *H04N 21/6125* (2013.01); *H04N 21/6175* (2013.01); *H04N 21/8549* (2013.01)

(58) Field of Classification Search
None
See application file for complete search history.

(56) References Cited

U.S. PATENT DOCUMENTS

| 7,949,118 B1 * | 5/2011 | Edamadaka | ...... | H04M 3/42221 370/260 |
| 2002/0059576 A1 * | 5/2002 | Feininger | ............... | H04N 7/165 725/1 |

(Continued)

OTHER PUBLICATIONS

Microsoft, "Obtaining a File Name From a File Handle" (Oct. 16, 2011), pp. 1-3, [retrieved from https://web.archive.org/web/20111016104820/http://msdn.microsoft.com/en-us/library/windows/desktop/aa366789(v=VS.85).aspx].*

(Continued)

*Primary Examiner* — Brian W Wathen
(74) *Attorney, Agent, or Firm* — BainwoodHuang

(57) ABSTRACT

A technique acquires online meeting data relating to an online meeting. The technique involves running, by processing circuitry, a set of programs (e.g., an operating system, a slideshow application, a word processing program, other programs, etc.) to carry out an online meeting which shares online meeting content among a set of users. The technique further involves performing, while the processing circuitry runs the set of programs to carry out the online meeting, a set of information collection operations by the processing circuitry. The set of information collection operations collects online meeting data from the set of programs. The collected online meeting data includes non-bitmap text-based information extracted from the set of programs (e.g., keywords, phrases, etc. obtained via procedure calls using standard APIs to the set of programs). The technique further involves storing, by the processing circuitry, the collected online meeting data in a designated location of computer memory.

20 Claims, 5 Drawing Sheets

(51) Int. Cl.
*H04N 21/4223* (2011.01)
*H04N 21/439* (2011.01)
*H04N 21/4788* (2011.01)
*H04N 21/61* (2011.01)
*H04N 21/8549* (2011.01)

(56) References Cited

U.S. PATENT DOCUMENTS

| | | | |
|---|---|---|---|
| 2003/0167339 A1* | 9/2003 | Zhu | H04L 12/1822 709/238 |
| 2003/0220973 A1* | 11/2003 | Zhu | H04L 12/1831 709/205 |
| 2008/0172681 A1* | 7/2008 | Donald | H04H 60/33 719/320 |
| 2008/0294649 A1 | 11/2008 | Murata et al. | |
| 2009/0006982 A1* | 1/2009 | Curtis | G06Q 10/10 715/753 |
| 2009/0019367 A1 | 1/2009 | Cavagnari et al. | |
| 2009/0119246 A1* | 5/2009 | Kansal | G06F 17/30038 |
| 2011/0099006 A1* | 4/2011 | Sundararaman | G10L 15/26 704/208 |
| 2012/0323575 A1 | 12/2012 | Gibbon et al. | |
| 2012/0323925 A1* | 12/2012 | Fitzsimmons | G06F 17/30038 707/741 |
| 2013/0191719 A1* | 7/2013 | Underhill | G06Q 10/10 715/231 |
| 2014/0278405 A1* | 9/2014 | Peters | G06F 17/30719 704/235 |

OTHER PUBLICATIONS

VonC, "Getting the headings from a Word document" (Nov. 8, 2008), pp. 1-5 [retrieved from http://stackoverflow.com/questions/274814/getting-the-headings-from-a-word-document].*
Microsoft, "How to: Get the titles of all the slides in a presentation (Open XML SDK)" (Jul. 27, 2012), pp. 1-7 [retrieved from https://msdn.microsoft.com/en-us/library/office/cc850843.aspx].*
Kay, E., "Experimental Extensions APIs" (Mar. 1, 2010), pp. 1-5 [retrieved from http://blog.chromium.org/2010/03/experimental-extension-apis.html].*
Chiu, P.; Boreczky, J.; Girgensohn, A.; Kimber, D., "LiteMinutes: an Internet-based system for multimedia meeting minutes" (2001), Proceedings of the 10th international conference on World Wide Web, pp. 140-149 [retrieved from http://dl.acm.org/citation.cfm?id=371971].*
International Search Report and Written Opinion for International Application No. PCT/US2014/47982 mailed from the International Searching Authority on Aug. 7, 2015, 10 pages.

* cited by examiner

ACQUIRING ONLINE MEETING DATA RELATING TO AN ONLINE MEETING

BACKGROUND

A conventional web conference typically shares visual data and voice data among multiple conference participants. To create a web conference, the conference participants connect their client devices to a conference server (e.g., through the Internet). The conference server typically processes visual data (e.g., a desktop view from a presenting participant, a camera view from each conference participant, etc.) and provides that visual data to the client devices for display on display screens so that all of the conference participants are able to view the visual data. Additionally, the conference server typically combines voice data from all of the conference participants into a combined audio feed, and shares this combined audio feed with all of the conference participants. Accordingly, conference participants are able to watch visual content, as well as ask questions and inject comments to form a collaborative exchange even though the conference participants may be scattered among remote locations.

Some conventional conference servers are capable of recording web conferences. As a result, a participant of a web conference or someone who missed the web conference is able to playback the web conference (e.g., to access an audio discussion, screenshots, etc.) at a later time. An online meeting system which operates in a manner similar to that described above is disclosed in U.S. application Ser. No. 12/978,214, entitled "SYSTEMS, METHODS, AND DEVICES FOR GENERATING A SUMMARY DOCUMENT OF AN ONLINE MEETING," the teachings of which are hereby incorporated in their entirety.

SUMMARY

Although conventional conference servers may be able to record web conferences, it may be difficult for someone to subsequently find a certain recorded web conference that he or she is interested in. For example, for someone to find a particular recorded web conference, that person may need to listen through or watch portions of several recorded web conferences before finding the particular recorded web conference in mind.

As an alternative, someone could be hired to manually label or transcribe each recorded web conference for future access. However, such manual labeling may be time consuming, burdensome and prone to labeling errors/inconsistencies.

In contrast to a conventional approach of gathering web conference recordings which remain unlabeled or which are manually labeled, improved techniques are directed to acquiring online meeting data in an automated manner from a set of programs (e.g., an operating system, a slideshow application, other user-level programs, and so on). Such operation enables convenient and consistent tagging of the online meeting data for later use (e.g., indexing, sorting, searching, etc.). In particular, information presented during an online meeting such as window titles, headers, subheadings, etc. can be extracted and subsequently used for accurate tagging of the online meeting data. Moreover, the automated nature of such operation alleviates the need for manual labeling which can be time consuming, burdensome and error prone.

One embodiment is directed to a method of acquiring online meeting data relating to an online meeting. The method includes running, by processing circuitry, a set of programs (or applications) to carry out an online meeting which shares online meeting content among a set of users. The method further includes performing, while the processing circuitry runs the set of programs to carry out the online meeting, a set of information collection operations by the processing circuitry. The set of information collection operations collects online meeting data from the set of programs. The collected online meeting data includes non-bitmap text-based information extracted from the set of programs (e.g., keywords, phrases, etc.). The method further includes storing, by the processing circuitry, the collected online meeting data in a designated location of computer memory.

In some arrangements, performing the set of information collection operations includes performing a set of library routines via a set of function or procedure calls to a set of application programming interfaces (APIs). Such operation obtains at least some of the non-bitmap text-based information extracted from the set of programs.

In some arrangements, the set of programs running on the processing circuitry includes an operating system. In these arrangements, performing the set of library routines via the set of function calls to the set of APIs may include extracting a set of window titles from the operating system via a set of operating system function calls to the operating system. In addition or as an alternative, performing the set of library routines via the set of function calls to the set of APIs may include extracting a set of file identifiers from a filesystem of the operating system via a set of file access function calls to the operating system.

In some arrangements, the set of programs running on the processing circuitry includes a word processing application. In these arrangements, performing the set of library routines via the set of function calls to the set of APIs may include extracting a set of headings from the word processing application via a set of word processing application function calls to the word processing application.

In some arrangements, the set of programs running on the processing circuitry includes a slide presentation application. In these arrangements, performing the set of library routines via the set of function calls to the set of APIs may include extracting a set of slide titles from the slide presentation application via a set of slide presentation application function calls to the slide presentation application.

In some arrangements, the set of programs running on the processing circuitry includes a browser application. In these arrangements, performing the set of library routines via the set of function calls to the set of APIs may include extracting a set of links from the browser application via a set of browser application function calls to the browser application.

In some arrangements, performing the set of information collection operations further includes tagging (i) the non-bitmap text-based information extracted from an operating system and (ii) the non-bitmap text-based information extracted from a user-level application. Such operation is capable of placing the non-bitmap text-based information in an indexable and searchable form prior to storing the collected online meeting data in the designated location of computer memory.

In some arrangements, tagging includes identifying keywords and phrases in the non-bitmap text-based information. In these arrangements, tagging may further include associating respective tags with portions of the non-bitmap text-based information based on keywords and phrases identified in the portions of the non-bitmap text-based information.

In some arrangements, associating the respective tags with the portions of the non-bitmap text-based information includes comparing the identified keywords and phrases with a predefined dictionary to discover a set of uncommon terms in the non-bitmap text-based information. Here, associating further includes attaching at least some of the respective tags to the portions of the non-bitmap text-based information based on the set of uncommon terms discovered in the non-bitmap text-based information.

In some arrangements, the method further includes ranking the portions of the non-bitmap text-based information based on the associated tags. Such operation enables organizing the portions of the non-bitmap text-based information (e.g., for searching, sorting, etc.).

In some arrangements, the method further includes capturing screenshots of the online meeting, and storing the captured screenshots in a set of screenshot files in the designated location of computer memory.

In some arrangements, the designated location of computer memory is an online workspace. In these arrangements, the method may further include providing remote access from the online workspace to a set of client devices through a computerized network to enable online users to access the collected online meeting data.

In some arrangements, providing remote access includes automatically constructing and outputting a set of navigation pages. Accordingly, one or more online users may then be able to find (e.g., search, sort, select, etc.) the collected online meeting data among other collections of online meeting data.

It should be understood that, in the cloud context, the electronic circuitry is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in acquiring online meeting data relating to an online meeting.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to acquiring online meeting data in an automated manner from a set of programs (e.g., an operating system, a slideshow application, other user-level programs, and so on). Such a technique enables accurate and consistent tagging of the online meeting data for later use (e.g., for indexing, sorting, searching, etc.). Along these lines, information presented during an online meeting such as window titles, headers, subheadings, etc. can be extracted (e.g., via procedure calls through standard APIs) and subsequently used for tagging the online meeting data. Furthermore, the automated nature of such operation alleviates the need for manual labeling which can be time consuming, burdensome and error prone.

Figure 1:
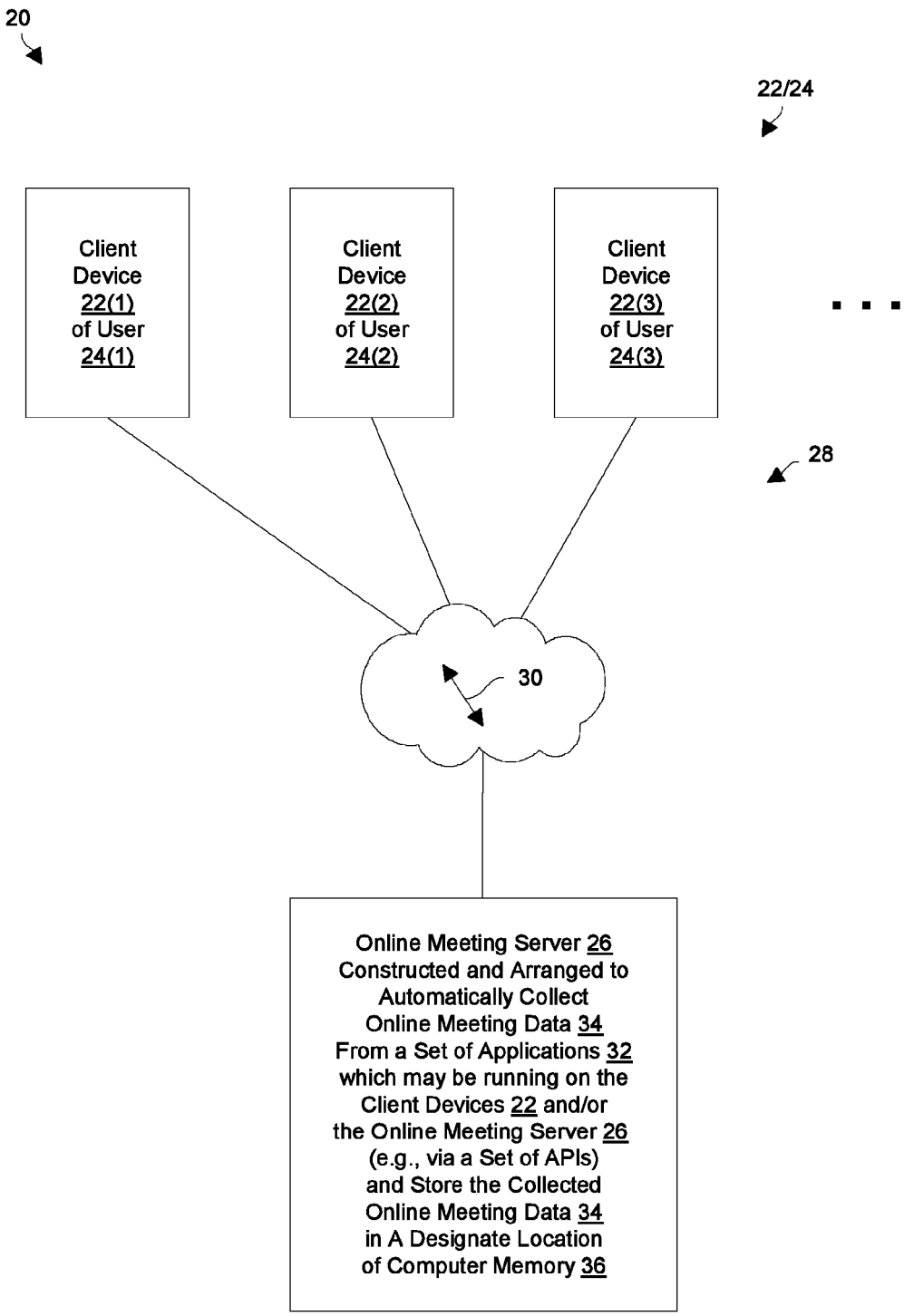
FIG. 1 is a block diagram of an electronic environment which is suitable for acquiring online meeting data in an automated manner from a set of programs.

FIG. 1 shows an electronic environment 20 which is suitable for acquiring online meeting data in an automated manner from a set of programs. The electronic environment 20 includes client devices 22(1), 22(2), 22(3), . . . (collectively, client devices 22) operated by respective users 24(1), 24(2), 24(3), . . . (collectively, users 24), an online meeting server 26, and communications medium 28.

Each client device 22 is constructed and arranged to operate, among other things, as an online meeting client, as well as perform other useful work, on behalf of a respective user 24. For example, the client device 22(1) enables a user 24(1) to participate in online meetings. Similarly, the client device 22(2) enables a user 24(2) to participate in online meetings, and so on. Examples of additional useful work include enabling respective users 24 to access the Internet via a browser application, operating as a word processor, allowing users 24 to read and send email and/or text messages, and so on. It should be understood that a variety of apparatus are suitable for use as the client devices 22 such as general purpose computers, user workstations, laptop computers, tablets, smart phones, voice over IP (VoIP) phones, standard telephones, combinations thereof, etc.

The online meeting server 26 is constructed and arranged to host online meetings among the users 24, as well as automatically collect and store online meeting data from one or more programs. In particular, the online meeting data may be stored in an online workspace for future access (e.g., searching, sorting, navigating, etc.) by one or more users 24. Moreover, it should be understood that the online meeting may take a variety of online collaboration approaches such as audio only, video only, a combination of audio and video, point-to-point, online conferencing, online webinars, online training, online technical assistance, online file sharing, online workspace sharing, online project management, online workflows, combinations thereof, and so on.

The communications medium 28 is constructed and arranged to connect the various components of the electronic environment 20 together to enable these components to exchange electronic signals 30 (e.g., see the double arrow 30). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, cellular communications, standard telephone communications, combinations thereof, etc.

During operation, each client device 22 runs a set of applications 32 to carry out an online meeting which shares online meeting content among the users 24. For example, the user 24(1) initially may be a presenter and run a slideshow program, and the other users 24(2), 24(3), . . . may participate as attendees to watch the slide show. Furthermore, at some point during the online meeting, one of the other users 24(2), 24(3), . . . may take over as the presenter and run the same slideshow program or perhaps a different program such as a word processor application, a browser, and so on. As a result, the online meeting participants are able to share visual content, as well as ask questions and inject comments to form a collaborative exchange even though the participants may be distributed across various remote locations.

Moreover, while each client device 22 runs its respective set of applications 32 to carry out the online meeting, the online meeting server 26 performs a set of information collection operations to collect online meeting data 34 from the client devices 22. Such collected online meeting data 34 includes, among other things, non-bitmap text-based information 88 (also see FIG. 3) and associated metadata extracted from the sets of applications 32, e.g., via standard API function calls to the applications running on the client devices 22. As will be explained in further detail below, such metadata describes particular attributes of the text such as text size, location, color, style (e.g., bold, italics, etc.), source object type, timing information, combinations thereof, and so on.

The online meeting server 26 then stores the collected online meeting data 34 in a designated location of computer memory 36, e.g., memory on the online meeting server 26, in the cloud, etc. Accordingly, the users 24 are able to later access the collected online meeting data 34 once the online meeting is over, e.g., to review material in closer detail, to study material if the user 24 missed the online meeting, etc.

In some arrangements, at least some of the collection of the online meeting data 34 is performed by one or more of the client devices 22. In these arrangements, the online meeting data 34 may be stored on a particular client device 22 and/or sent to another computerized storage location (i.e., computer memory 44) such as the online meeting server 26 or separate cloud storage at a later time for subsequent access by other users 24.

Additionally, in some arrangements, the online meeting server 26 locally runs a set of applications 32 to collect online meeting data 34. As mentioned earlier, such collected online meeting data 34 may include a combination of visual and audio data exchanged during the online meeting. Further details will now be provided with reference to FIG. 2.

Figure 2:
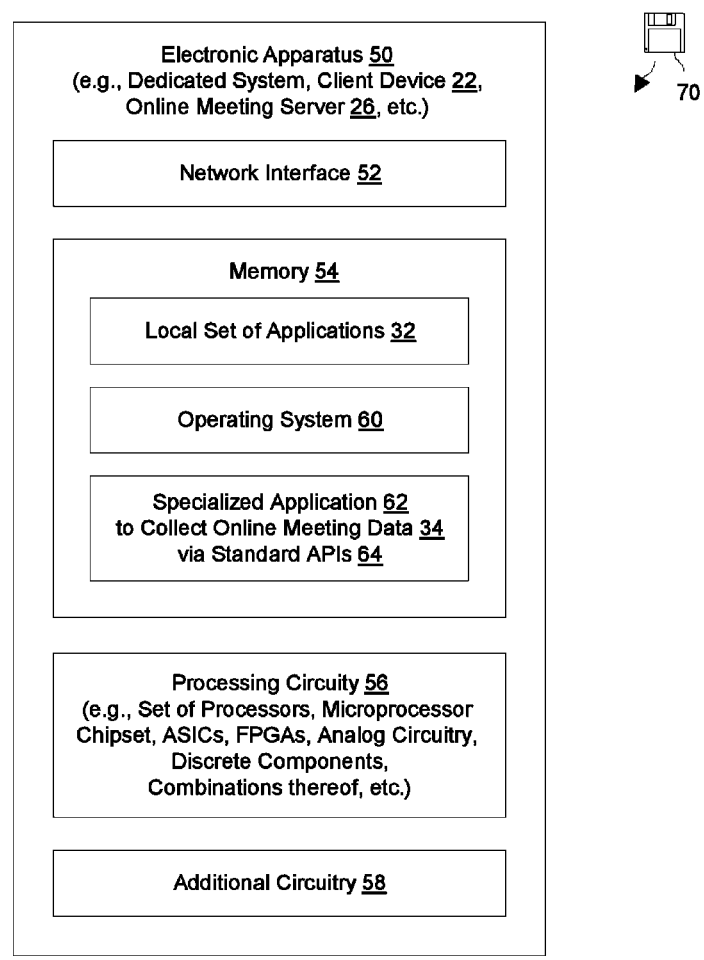
FIG. 2 is a block diagram of an electronic apparatus of the electronic environment of FIG. 1.

FIG. 2 is a block diagram of an electronic apparatus 50 of the electronic environment 20 of FIG. 1. The electronic apparatus 50 is suitable for use as a client device 22, the online meeting server 26, and/or a dedicated system. In any of these situations, the electronic apparatus 50 collects and stores online meeting data 34 for future access by the users 24. As shown in FIG. 2, the electronic apparatus 50 includes a network interface 52, memory 54, processing circuitry 56, and additional circuitry 58.

The network interface 52 is constructed and arranged to connect the electronic apparatus 50 to the communications medium 28 (also see FIG. 1). Accordingly, the network interface 52 enables the electronic apparatus 50 to communicate with the other components of the electronic environment 20. Such communications may be copper-based, optical-based or wireless (i.e., IP-based, POTS-based, SAN-based, cellular, Bluetooth, combinations thereof, and so on).

The memory 54 is intended to represent both volatile storage (e.g., DRAM, SRAM, etc.) and non-volatile storage (e.g., flash memory, magnetic disk drives, etc.). The memory 54 stores a variety of software constructs including a local set of applications 32, an operating system 60 (i.e., essentially an application 32), and a specialized application 62 to collect online meeting data 34 via a set of standard APIs 64 (i.e., the specialized application 62 is capable of extracting non-bitmap text-based information from the set of applications 32 via standard API function calls).

The processing circuitry 56 is constructed and arranged to operate in accordance with the various software constructs stored in the memory 54. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 70 is capable of delivering all or portions of the software to the electronic apparatus 50. The computer program product 70 has a non-transitory (or non-volatile) computer readable medium which stores a set of instructions which controls one or more operations of the electronic apparatus 50. Examples of suitable computer readable storage media include tangible articles of manufacture and apparatus which store instructions in a non-volatile manner such as CD-ROM, flash memory, disk memory, tape memory, and the like.

The additional circuitry 58 is dependent on whether the electronic apparatus 50 is a client device 22, the online meeting server 26, or a dedicated external system. For example, if the electronic apparatus 50 is a user's workstation, the additional circuitry 58 may include user interface hardware such as a standard keyboard, a pointing device (e.g., mouse), a headset (e.g., microphone and speakers) and a display. Similarly, if the electronic apparatus 50 is a user's smart phone or tablet device, the additional circuitry 58 may include a touch screen, a camera, phone hardware, and so on.

Alternatively, if the electronic apparatus 50 is the online meeting server 26 or a dedicated external system, the additional circuitry 58 may include other types of specialized hardware. For example, if the electronic apparatus 50 operates as a central location from which to share online meeting data 34 from multiple online meetings among the users 24, the electronic apparatus 50 may include web server circuitry to serve web pages to the users 24. Such additional circuitry 58 enables the users 24 to navigate among multiple web pages to search, rank, sort, select, etc online meeting data 34 collected from the various online meetings. Further details will now be provided with reference to FIG. 3.

Figure 3:
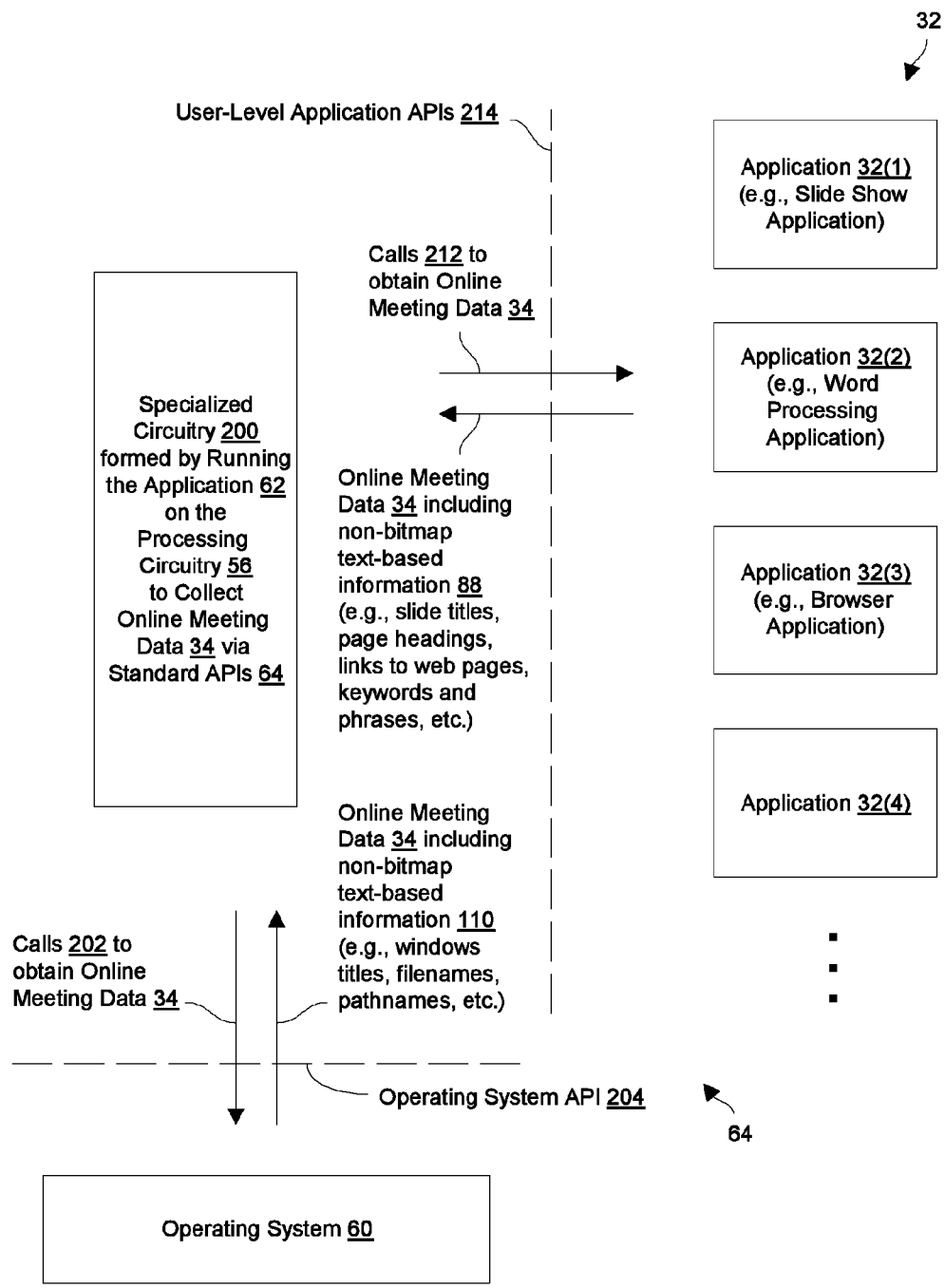
FIG. 3 is a block diagram showing particular details of the electronic apparatus during operation.

FIG. 3 is a block diagram showing particular details of the electronic apparatus 50 during operation. In particular, specialized circuitry 200 is formed when the processing circuitry 56 of the electronic apparatus 50 operates in accordance with instructions of the specialized application 62 (also see FIG. 2).

As shown in FIG. 3, the specialized circuitry 200 is capable of collecting the online meeting data 34 from applications 32 during an online meeting hosted by the online meeting server 26. Along these lines, the specialized circuitry 200 accesses the operating system 60 running on the electronic apparatus 50 via calls 202 to the operating system 60 using an operating system API 204 (see horizontal dashed line in FIG. 3). Similarly, the specialized circuitry 100 accesses user-level applications 32(1), 32(2), . . . running on the electronic apparatus 50 via calls 212 to the operating system 60 using respective user-level application APIs 214 (see vertical dashed line in FIG. 3).

For example, suppose that a user 24 directs the specialized circuitry 200 to collect windows header or title information from certain windows used in a particular online meeting. Such direction may be supplied by the user via a GUI, a command line interface, etc. In response, the specialized circuitry 200 accesses the operating system 60 of the electronic apparatus 50 via the operating system API 204 to collect the windows header information from the operating system 60.

An example standard function or procedure call 202 to the operating system 60 is:

get_window_header(input parameters);

which retrieves window header online meeting data 34 including non-bitmap text-based window header information from the operating system 60. Here, the input parameters may include an online meeting identifier (e.g., if the electronic apparatus is the online meeting server 26 hosting multiple online meetings simultaneously). The input parameters may also include other controls such as "foreground" to retrieve a window header from a target window in the foreground, "background" to retrieve a window header from a target window in the background, or "all" to retrieve window headers from windows in the all of the windows and/or tabs which are active during the online meeting. Additional input parameters are suitable for use as well.

Another example standard function/procedure call to the operating system 60 is:

get_filename(input parameters);

which retrieves filename online meeting data 34 including non-bitmap text-based window header information from the operating system 60 (e.g., the names of files which were accessed during the online meeting). Again, the input parameters may include other input such as an online meeting identifier, and so on.

Moreover, other standard calls 202 to the operating system 60 are available for use as well. For example, using the standardized operating system API 204, the specialized circuitry 200 may extract path names to directories, time information, attendee information, and so on.

Similarly, the user 24 may direct the specialized circuitry 200 to gather and store online meeting data 34 from certain user-level applications 32 which are used in a particular online meeting. As mentioned above, the specialized circuitry 200 accesses the user-level applications 32 of the electronic apparatus 50 via the user-level application APIs 214.

An example standard call 212 to a user-level slide show application 32 is:

get_slideshow_titles(input parameters);

which retrieves online meeting data 34 including non-bitmap text-based information such as slide show titles from a slide show application 32. Here, the input parameters may include target commands to pinpoint particular types of title information such as main titles, subtitles, text from specific slides or slide locations, and so on. Additionally, the input parameters may include filtering commands to exclude certain types of slide information such as keywords and phrases in lists or following bullets, etc. Other input parameters are suitable for use as well.

Likewise, the user may direct the specialized circuitry 200 to collect online meeting data 34 from other user-level applications 32 such as a word processing application (e.g., page headings, titles, etc.), a browser application (e.g., URLs or links, keywords or phrases, etc.), an email application (e.g., email messages, subject line information, attachments, etc.), and so on.

It should be understood that the online meeting data 34 which is extracted from the applications 32 may include items of text as well as metadata which describes attributes related to the items of text. An item of text and associated metadata can be returned in response to a single API call 212 (e.g., included as part of the non-bitmap text-based information, returned within various fields of a data structure, etc.). In other arrangements, an item of text and its associated metadata can be returned via separate API calls 212. It should be further understood that such metadata is useful in making inferences on items of text when there are no direct candidates.

Along these lines, the earlier-provided examples illustrate ways of obtaining particular items of text directly from an application when the API is robust and the creator of the content has properly labeled the items within the content. For example, to extract a title from a slideshow (or a slide), the application may support the API call "get_slideshow_titles( )", and the creator of the slideshow may have properly labeled an item of the slideshow (or of a particular slide) as the title so that the API call properly returns that item.

However, suppose that a particular application 32 does not provide an API call 212 which directly identifies a particular item of text, or that the content creator has not properly labeled items of text. In such situations, the title can be inferred from the associated metadata. Examples of suitable metadata include text size, location within a context (e.g., screen location, location within a slide or a document, etc.), text color, text style (e.g., bold, italics, etc.), text case (e.g., upper case vs. lower case), relevance based on whether the text resides in a relevance database or whether the text includes delimiters (e.g., bullets, a copyright symbol, etc.), source object type, timing information (e.g., timestamps, amounts of time displayed, a display order, etc.), combinations thereof, and so on.

For example, suppose that a particular slide does not include any word or phrase which is labeled expressly as a title. Rather, suppose that the extracted online meeting data 34 includes a first phrase which is identified by associated metadata as a center title, a second phrase which is identified by associated metadata as a subtitle, a third phrase which is identified by associated metadata as residing within a square object, and a fourth phrase which is identified by associated metadata as residing within a circle object. In these situations, a set of inference operations can be performed on the gathered information to select a particular item as the title such as the first phrase which is identified by associated metadata as a center title.

As another example, suppose that multiple slides are displayed during a particular slideshow, and that each item of text extracted from the slideshow has associated metadata indicating when and how long the item of data was displayed during the slideshow. In this situation, a set of inference operations can be performed on the gathered information to weight each item of online meeting data 34 as a possible candidate for a title of the slideshow. The weight of each item may be based on the order of presentation (i.e., the first displayed item, the next displayed item, the last displayed item, etc.), how long the item was displayed, and so on. Other attributes may be factored into the weights as well such as font size, text location, text color, text style, etc. The set of inference operations then selects the title (or subtitle, etc.) from the items of online meeting data 34 based on the assigned weights. Further details will now be provided with reference to FIG. 4.

Figure 4:
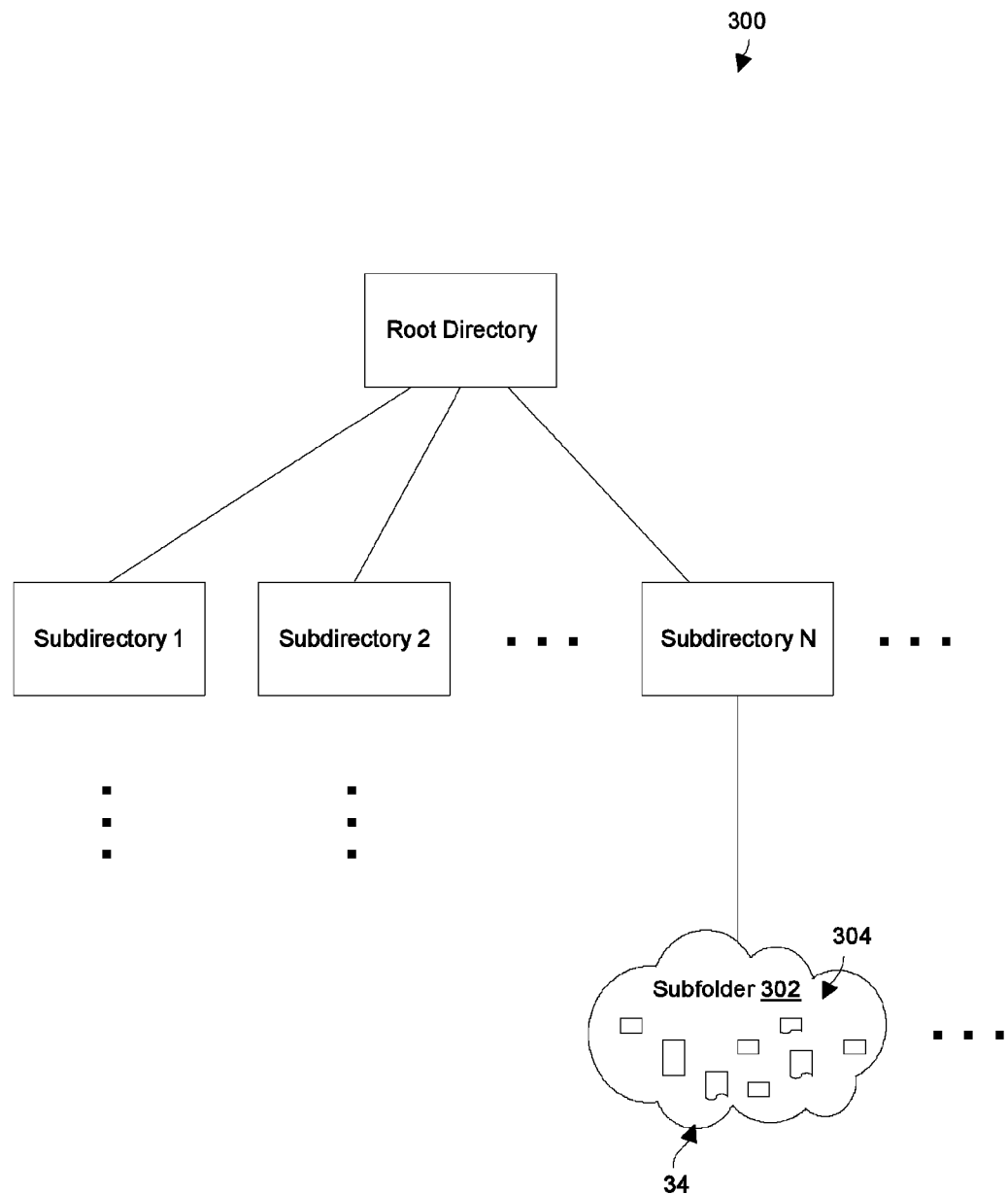
FIG. 4 is a block diagram illustrating a suitable logical form for storing online meeting data which has been acquired in an automated manner from a set of programs.

FIG. 4 is a block diagram illustrating a suitable logical form for storing online meeting data 34 which has been acquired in an automated manner from a set of programs 32 (also see FIG. 3). In particular, FIG. 4 shows a file system 300 having the form of an inverted tree. That is, the file system 300 includes a set of subdirectories (e.g., subdirectories 1, 2, . . . , N). One of the subdirectories includes a dedicated storage location, i.e., subfolder 302, which holds the online meeting data 34 collected from a particular online meeting.

In some arrangements, the online meeting data 34 is separated into multiple files 304 of various file types. For example, one file can include a list of headings from a slide show that is presented using a slide show application 32 during an online meeting. As another example, another file can include a list of URLs or webpage links that were visited using a browser application 32 during the online meeting. As yet another example, yet another file can include a list of filenames or the files themselves that were touched, read or opened by the operating system 60 during the online meeting, and so on.

In some arrangements, the subfolder 302 is a shared workspace that the users 24 are able to access at any time, e.g., during the online meeting, after the online meeting, etc. Accordingly, the users 24 can more thoroughly study the online meeting data 34 during and after the online meeting.

In some arrangements, the collected online meeting data 34 can be augmented with other data such as screen shots, audio captions, etc. This other data may be tagged, ranked, sorted, etc. as well. Moreover, non-text-based information may be included in the collected online meeting data 34 to enrich the stored content (e.g., screenshots, photos, audio clips, etc.).

In some arrangements, the various files 304 and/or content within the files (e.g., non-bitmap text-based information extracted from the applications) is tagged by the specialized circuitry 200 in real time during the online meeting. Alternatively, a recording of the online meeting is tagged via post-processing after the online meeting. Such tagging enables the files and/or file content to be indexed, sorted, searched, etc. for subsequent convenient access.

In some arrangements, the tagged online meeting data 34 from separate online meetings is stored in respective subfolders 302 (i.e., separate subfolders or subdirectories). Accordingly, each subfolder 302 holds a collection of tagged online meeting data from a particular online meeting.

In other arrangements, online meeting data 34 from different online meetings is commingled in a single subfolder or subdirectory. In these arrangements, the online meeting data 34 is sufficiently tagged to enable the users 24 to individually identify and access the content of the online meetings.

With the files and/or file content tagged, users 24 are now able to find meetings that they are interested in. Along these lines, the users 24 are able to discover and search online meeting data from online meetings (e.g., search for interesting content). Furthermore, in contrast to conventional voice transcription which can improperly tag or misspell technical terms, the collected content here is guaranteed to be correct and applicable since it includes actual non-bitmap text-based extracted from the applications 32 used during the online meetings. In particular, important data about the online meeting from the operating system 60 about the application(s) 32 in focus (e.g., the window title, headings, and other text in the application windows, etc.) is automatically retrieved and stored electronically by the specialized circuitry 200. Additionally, the specialized circuitry 200 can hook into common applications such as common slide show applications, word processing applications, etc. and, from them, collect slide titles, transitions, and other online meeting data about the subjects discussed.

For example, after removing common phrases from the titles of slides, the specialized circuitry 200 can generate a good summary of the online meeting by just listing the titles one after the other. Also, uncommon words in titles and the rest of the content in slides can serve as good keywords for tags and searching. Furthermore, the specialized circuitry 200 can also take snapshots of screen sharing sessions when there are big changes followed by a long period of small or no changes. Moreover, for the case of a slide show presentation, the specialized circuitry 200 can generate slide images by hooking into slide show program 32 based on slide changes and thus generate a visual summary of the meeting. Also, the specialized circuitry 200 can extract hyperlinks visited, or present in the slides. The specialized circuitry 200 can also monitor files touched by the presenters during the presentation, and so on.

Once the online meeting data 34 is placed in a location in computer memory, all of that information, including tags and keywords, can be made available to an online workspace. Accordingly, users can then search for meetings based on slide/snapshot titles, keywords, tags, etc. Also, users 24 can discover interesting content via posting/searching the tags in a tag cloud.

Further, users 24 can easily edit the summary, tags, and other information uploaded to the shared workspace to improve accuracy and remove things. Additionally, the specialized circuitry 200 can improve summarization further by noting how long each slide or snapshot was on screen, and using that to weigh the data gathered from that slide (e.g., by applying weights to each content item), or during that snapshot, and so on.

It should be understood that various organization schemes other than a file system 300 can be used to arrange online meeting data 34 easy navigation, e.g., in different subdirectory layers, in a database, etc. In some arrangements, the specialized circuitry 200 provides a set of navigation web pages. Accordingly, one or more online users 24 may then be able to find (e.g., search, sort, select, etc.) the collected online meeting data 34 among other collections of online meeting data 34. Further details will now be provided with reference to FIG. 5.

Figure 5:
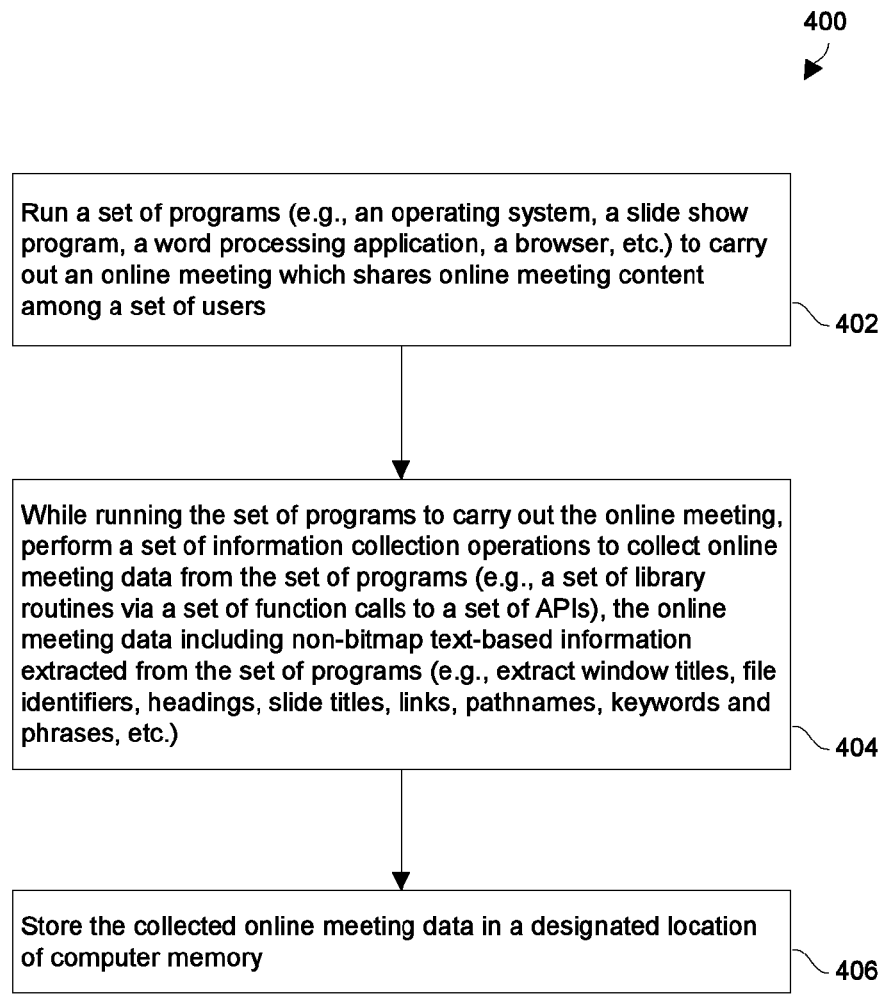
FIG. 5 is a flowchart of a procedure which is performed by an electronic apparatus when acquiring online meeting data in an automated manner from a set of programs.

FIG. 5 is a flowchart of a procedure 400 which is performed by an electronic apparatus 50 (FIG. 2) when collecting online meeting data 34 in an automated manner from a set of programs 32 (FIG. 3).

In step 402, the electronic apparatus 50 runs a set of programs 32 to carry out an online meeting which shares online meeting content among a set of users 24. Along these lines, the online meeting server 26 hosts the online meeting by operating as both a video engine and an audio engine to share video and audio among the client devices 22.

In step 404, while the electronic apparatus 50 runs the set of programs 32 to carry out the online meeting, the electronic apparatus 50 performs a set of information collection operations. In particular, the electronic apparatus 50 collects online meeting data 34 from the set of programs 32 (e.g., via standard APIs). The collected online meeting data 34 includes non-bitmap text-based information extracted from the set of programs 32 (e.g., window titles, file names and paths, headers, links, etc.).

In step 406, the electronic apparatus 50 stores the collected online meeting data 34 in a designated location of computer memory. Accordingly, users 24 are able to access the online meeting data 34 for a richer experience, e.g., tag, index, search, filter, etc. the online meeting data 34.

As described above, improved techniques are directed to acquiring online meeting data 34 in an automated manner from a set of programs 32 (e.g., an operating system, a slideshow application, other user-level programs, and so on). Such operation enables convenient and consistent tagging of the online meeting data 34 for later use (e.g., indexing, sorting, searching, etc.). In particular, information presented during an online meeting such as window titles, headers, subheadings, etc. can be extracted and subsequently used for tagging the online meeting data 34. Moreover, the automated nature of such operation alleviates the need for manual labeling which can be time consuming, burdensome and error prone.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on. Such modifications and enhancements are intended to belong to various embodiments of the disclosure.

What is claimed is:

1. A method of acquiring online meeting data relating to an online meeting, the method comprising:
   running, by processing circuitry, a set of programs to carry out an online meeting which shares online meeting content among a set of users;
   while the processing circuitry runs the set of programs to carry out the online meeting, performing a set of information collection operations by the processing circuitry, the set of information collection operations collecting online meeting data from the set of programs, the collected online meeting data including non-bitmap text-based information extracted from the set of programs; and
   storing, by the processing circuitry, the collected online meeting data in a designated location of computer memory;
   wherein performing the set of information collection operations includes:
   identifying keywords and phrases in the non-bitmap text-based information, and
   associating respective tags with portions of the non-bitmap text-based information based on keywords and phrases identified in the portions of the non-bitmap text-based information; and
   wherein associating the respective tags with the portions of the non-bitmap text-based information includes:
   comparing the identified keywords and phrases with a predefined dictionary to discover a set of uncommon terms in the non-bitmap text-based information, and
   attaching at least some of the respective tags to the portions of the non-bitmap text-based information based on the set of uncommon terms discovered in the non-bitmap text-based information.

2. A method as in claim 1 wherein performing the set of information collection operations includes:
   performing a set of library routines via a set of function calls to a set of application programming interfaces (APIs) to obtain at least some of the non-bitmap text-based information extracted from the set of programs.

3. A method as in claim 2 wherein the set of programs running on the processing circuitry includes an operating system; and wherein performing the set of library routines via the set of function calls to the set of APIs includes:
   extracting a set of window titles from the operating system via a set of operating system function calls to the operating system.

4. A method as in claim 2 wherein the set of programs running on the processing circuitry includes an operating system; and wherein performing the set of library routines via the set of function calls to the set of APIs includes:
   extracting a set of file identifiers from the operating system via a set of file access function calls to the operating system.

5. A method as in claim 2 wherein the set of programs running on the processing circuitry includes a word processing application; and wherein performing the set of library routines via the set of function calls to the set of APIs includes:
   extracting a set of headings from the word processing application via a set of word processing application function calls to the word processing application.

6. A method as in claim 2 wherein the set of programs running on the processing circuitry includes a slide presentation application; and wherein performing the set of library routines via the set of function calls to the set of APIs includes:
   extracting a set of slide titles from the slide presentation application via a set of slide presentation application function calls to the slide presentation application.

7. A method as in claim 2 wherein the set of programs running on the processing circuitry includes a browser application; and wherein performing the set of library routines via the set of function calls to the set of APIs includes:
   extracting a set of links from the browser application via a set of browser application function calls to the browser application.

8. A method as in claim 2 wherein the set of programs running on the processing circuitry includes an operating system and a user-level application; wherein performing the set of library routines via the set of function calls to the set of APIs includes:
   extracting some non-bitmap text-based information from the operating system via a set of operating system function calls to the operating system, and
   extracting other non-bitmap text-based information from the user-level application via a set of user-level application function calls to the user-level application; and
   wherein
   attaching the respective tags to the portions of the non-bitmap text-based information places (i) the non-bitmap text-based information extracted from the operating system and (ii) the non-bitmap text-based information extracted from the user-level application in an indexable and searchable form prior to storing the collected online meeting data in the designated location of computer memory.

9. A method as in claim 1 wherein attaching at least some of the respective tags to the portions of the non-bitmap text-based information is performed in real time during the online meeting.

10. A method as in claim 1 wherein attaching at least some of the respective tags to the portions of the non-bitmap text-based information is performed based on a recording of the online meeting in a post-processing manner after the online meeting.

11. A method as in claim 8, further comprising:
ranking the portions of the non-bitmap text-based information based on the associated tags to organize the portions of the non-bitmap text-based information.

12. A method as in claim 2, further comprising:
capturing screenshots of the online meeting, and
storing the captured screenshots in a set of screenshot files in the designated location of computer memory.

13. A method as in claim 2 wherein the designated location of computer memory is an online workspace; and wherein the method further comprises:
providing remote access from the online workspace to a set of client devices through a computerized network to enable online users to access the collected online meeting data.

14. A method as in claim 2 wherein providing remote access includes:
automatically constructing and outputting a navigation page to enable the online users to find the collected online meeting data among other collections of online meeting data.

15. A computer program product having a non-transitory computer readable medium which stores a set of instructions to acquire online meeting data relating to an online meeting; the set of instructions, when carried out by computerized circuitry, causing the computerized circuitry to perform a method of:
running a set of programs to carry out an online meeting which shares online meeting content among a set of users;
while running the set of programs to carry out the online meeting, performing a set of information collection operations by the processing circuitry, the set of information collection operations collecting online meeting data from the set of programs, the collected online meeting data including non-bitmap text-based information extracted from the set of programs; and
storing, by the processing circuitry, the collected online meeting data in a designated location of computer memory;
wherein performing the set of information collection operations includes:
identifying keywords and phrases in the non-bitmap text-based information, and
associating respective tags with portions of the non-bitmap text-based information based on keywords and phrases identified in the portions of the non-bitmap text-based information; and
wherein associating the respective tags with the portions of the non-bitmap text-based information includes:
comparing the identified keywords and phrases with a predefined dictionary to discover a set of uncommon terms in the non-bitmap text-based information, and
attaching at least some of the respective tags to the portions of the non-bitmap text-based information based on the set of uncommon terms discovered in the non-bitmap text-based information.

16. A computer program product as in claim 15 wherein performing the set of information collection operations includes:
performing a set of library routines via a set of function calls to a set of application programming interfaces (APIs) to obtain at least some of the non-bitmap text-based information extracted from the set of programs.

17. A computer program product as in claim 16 wherein the set of programs running on the processing circuitry includes an operating system and a user-level application; wherein performing the set of library routines via the set of function calls to the set of APIs includes:
extracting some non-bitmap text-based information from the operating system via a set of operating system function calls to the operating system, and
extracting other non-bitmap text-based information from the user-level application via a set of user-level application function calls to the user-level application; and
wherein
attaching the respective tags to the portions of the non-bitmap text-based information places (i) the non-bitmap text-based information extracted from the operating system and (ii) the non-bitmap text-based information extracted from the user-level application in an indexable and searchable form prior to storing the collected online meeting data in the designated location of computer memory.

18. A computer program product as in claim 15 wherein the method further comprises:
capturing screenshots of the online meeting, and
storing the captured screenshots in a set of screenshot files in the designated location of computer memory.

19. A computer program product as in claim 15 wherein the designated location of the memory is an online workspace; and wherein the method further comprises:
providing remote access from the online workspace to a set of client devices through the network interface to enable online users to access the collected online meeting data.

20. An electronic apparatus, comprising:
a network interface;
memory; and
processing circuitry coupled to the network interface and the memory, the memory storing instructions which, when carried out by the processing circuitry, cause the processing circuitry to:
run a set of programs to carry out an online meeting through the network interface, the online meeting sharing online meeting content among a set of users,
while running the set of programs to carry out the online meeting, perform a set of information collection operations, the set of information collection operations collecting online meeting data from the set of programs, the collected online meeting data including non-bitmap text-based information extracted from the set of programs, and
store the collected online meeting data in a designated location of the memory;
wherein the processing circuitry, when performing the set of information collection operations, is constructed and arranged to:
identify keywords and phrases in the non-bitmap text-based information, and
associate respective tags with portions of the non-bitmap text-based information based on keywords and phrases identified in the portions of the non-bitmap text-based information; and
wherein the processing circuitry, when associating the respective tags with the portions of the non-bitmap text-based information, is constructed and arranged to:
compare the identified keywords and phrases with a predefined dictionary to discover a set of uncommon terms in the non-bitmap text-based information, and
attach at least some of the respective tags to the portions of the non-bitmap text-based information based on the set of uncommon terms discovered in the non-bitmap text-based information.

* * * * *